Sept. 16, 1969     H. CORLEIS ETAL     3,466,923
APPARATUS FOR CALIBRATING COMPASSES
Filed April 5, 1966
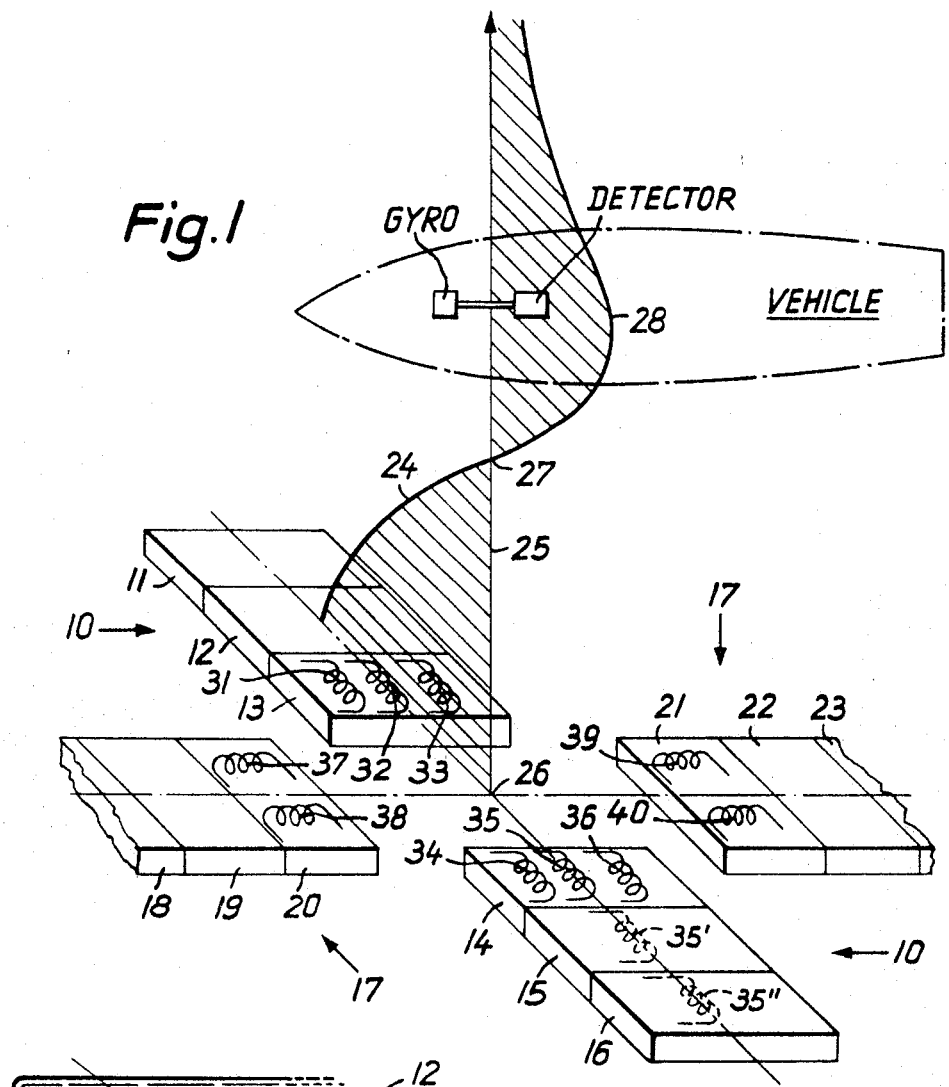
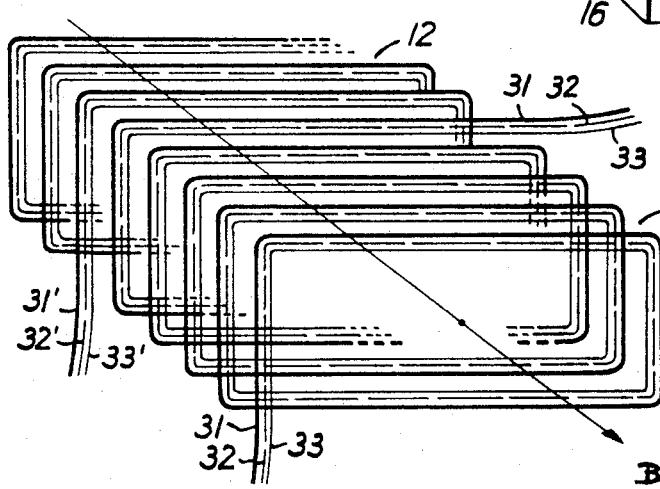
Inventors:
Edgar Roesger
Rainer Bernotat
Horst Corleis
By: Spencer & Hayt
Attorneys

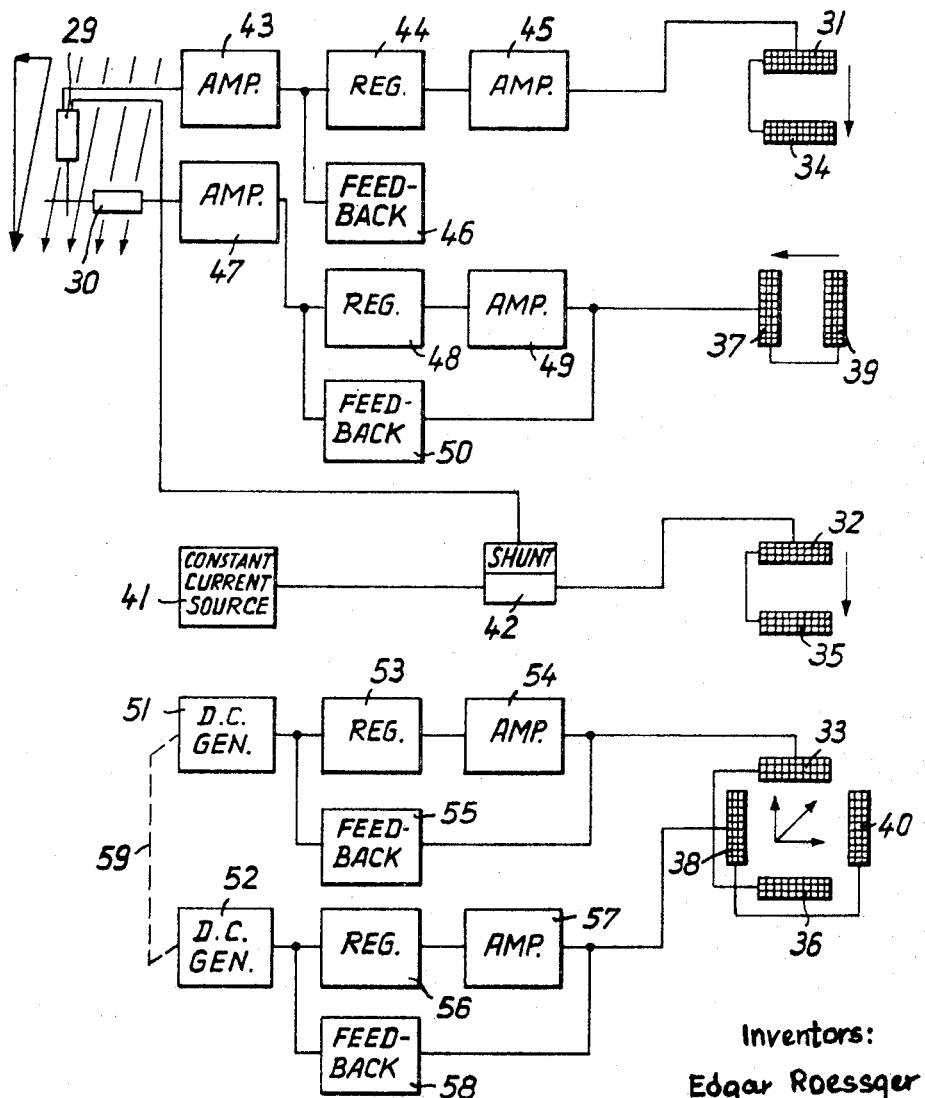

United States Patent Office 3,466,923
Patented Sept. 16, 1969

3,466,923
APPARATUS FOR CALIBRATING COMPASSES
Horst Corleis, Buxtehude, and Rainer Bernotat and Edgar Roessger, Berlin, Germany, assignors to Licentia Patent-Verwaltungs-G.m.b.H., Frankfurt am Main, Germany
Filed Apr. 5, 1966, Ser. No. 540,264
Claims priority, application Germany, Apr. 9, 1965, L 50,426
Int. Cl. G01c 17/38
U.S. Cl. 73—1
10 Claims

ABSTRACT OF THE DISCLOSURE

A device for use in determining the bearing error produced in a compass-guided directional gyro provided with a magnetic field detector, which bearing error is due to the extraneous magnetic field produced by the vehicle in which such detector is mounted. The device includes a coil arrangement disposed outside of the vehicle whose position is to be examined and positioned for producing a magnetic field which is external to itself and which extends through the region occupied by the detector, and a variable current producing circuit connected to the coil arrangement for supplying currents thereto whose amplitudes determine the intensity and direction of the external magnetic field.

---

The present invention relates to the field of electromagnetic devices, and particularly to a device for testing aircraft navigation systems.

For purposes of navigation, aircraft are often equipped with directional gyros controlled by magnetic compasses or detectors. The signal which the magnetic compass supplies to the directional gyro is intended to represent the true magnetic bearing. However, the actual magnetic compass bearing is generally a combination of the magnetic bearing and a bearing error due to extraneous magnetic fields. Such extraneous fields are produced, for example, in the airplane itself by the presence of magnetized iron parts, circuits through which direct currents flow, etc. The process of measuring and cancelling the effect of these extraneous fields is known as compensation.

It is generally necessary to effect a compensation of the extraneous fields originating in the aircraft so that magnetic field detectors, which replace the magnetic compasses for test purposes and which serve for measuring the direction of the earth's magnetic field, can accurately perform such a measurement. Accordingly, in order to effect such a compensation, it is first necessary to determine the magnitude and direction of the extraneous fields and to then determine the effect of this field.

It has already been suggested to make such a determination by measuring the magnetic field within the aircraft while rotating the aircraft, preferably on the ground, through 360° in a horizontal plane. The magnetic declination between the compass bearing registered within the aircraft and the true magnetic bearing is then an indication of the magnitude of the extraneous fields for each respective direction of the aircraft longitudinal axis. The true magnetic bearing is the correct bearing value which must be supplied to the directional gyro. As has been mentioned above, the indicated compass bearing is a combination of the true magnetic bearing and the bearing error due to extraneous fields.

In order to carry out this process, it has heretofore always been necessary to rotate the aircraft in earth's magnetic field in steps of 30°, for example, and a maximum accuracy of one degree residual deviation has been thus far obtainable. However, certain problems have been encountered in carrying out such a process. For example, it has been found difficult to achieve a precise angular positioning of the aircraft for each measurement, even when using apparatus which is specifically designed for this purpose. In addition, since this process is normally carried out by placing the aircraft on a rotating table which is rotated with the aid of a tractor, it can easily happen that one of the aircraft wheels will slip off the table during rotation and cause damage to the landing gear to which the wheel is attached. Furthermore, this process is very time-consuming.

Once the magnitude and direction of the extraneous field of the aircraft is determined in this manner, this field is compensated by the application of an opposing field to the magnetic direction-finding apparatus.

Another type of process has also been proposed in which it is not necessary to rotate the aircraft in the manner described above. In order to plot the bearing error curve according to this technique, a simulation of the aircraft rotation with respect to earth's magnetic field is produced. A detector within the aircraft initially measures a magnetic field which is composed of earth's magnetic field and the aircarft extraneous field and converts the measured value into an electrical signal whose amplitude is proportional to the direction of the detected magnetic field. The measuring coils of the detecting device are then subjected to the influence of additional electrical signals which simulate the rotation of the aircraft in earth's magnetic field. These latter signals are in the form of direct currents which flow through the measuring coils of the detector in such a manner that the resulting field to which the detecting device is subjected is substantially equivalent to earth's magnetic field for a given bearing. Since the measuring coils are normally provided in a three-phase arrangement, three variable-amplitude direct currents must be supplied thereto and the accuracy with which each direct current must be individually adjusted requires the use of relatively expensive current control apparatus. Furthermore, in order to carry out this technique, it is necessary to introduce additional connections into the compass-guided directional gyro unit provided on board the aircraft.

It has been found that a number of difficulties are encountered in carrying out this technique. One of these difficulties is due to the fact that the device for generating the individual direct currents can not be adjusted to fixed values because the amplitudes of the direct currents must be different for each separate geographical location in order to effect the required field cancellation for that location. In order to adjust these direct currents for any particular location, the detector must therefore be removed from the influence of the aircraft, disassembled, and measured with the aid of relatively expensive test apparatus which is indispensible to a correct adjustment of the detector. This adjustment is also made necessary by the fact that magnetic changes occur in the coil core material of the detecting device, which changes occur regularly with the passage of time, and compensation must be made for these changes.

It has already been proposed to carry out the desired field cancellation at the detector by means of specific coil arrangements disposed outside of the detector. These coil arrangements may be provided either inside or outside of the aircraft and are so disposed that the field which they create serves to cancel out earth's magnetic field. While it is true that the previously-mentioned disadvantages and difficulties are essentially eliminated by this latter procedure, it has been found that new difficulties arise with reference to the uniformity of the magnetic field in the region enclosed by the detector. The provision of the previously-mentioned coil arrangement within the aircraft is generally unsatisfactory because of lack of space, the required uniformity of the field presupposing a certain minimum coil size.

It is an object of the present invention to overcome the above-mentioned difficulties.

Another object of the present invention is to provide an improved arrangement for determining the extraneous fields existing within the aircraft.

Still another object of the present invention is to provide for the creation of a sufficiently uniform artificial magnetic field to offset the effect of earth's magnetic field in a detector.

Another object of the present invention is to provide a resultant magnetic field at the detector having any desired amplitude and direction.

According to the present invention, these objects are achieved by the provision of a device for use in determining the bearing error produced in a compass-guided directional gyro provided with a magnetic field detector, which bearing error is due to extraneous magnetic fields produced by the vehicle on which such detector is mounted. The device is primarily constituted by a coil arrangement disposed in a region outside of the vehicle whose system is to be examined. This coil arrangement serves to produce an artificial magnetic field which is external to itself and which has a variable direction and intensity in the region in which the detector is located. With such an artificial field applied to the detector, the difference between the directional indication of the directional gyro and the resultant direction of the superposed ambient terrestrial field and the artificial magnetic field will constitute the bearing error to be determined. There is also provided variable current producing means connected to the coil arrangement for supplying currents thereto whose amplitudes determine the intensity and direction of the artificial magnetic field.

The term "artificial" as used herein denotes a real magnetic field which is artificially produced, e.g., by an electric current, as opposed to earth's naturally produced magnetic field.

Additional objects and advantages of the present invention will become apparent upon consideration of the following description when taken in conjunction with the accompanying drawings in which:

FIGURE 1 is a perspective, diagrammatic view of one embodiment of a coil arrangement according to the present invention.

FIGURE 1a shows the winding arrangement of a subcoil.

FIGURE 2 is a block diagram of a preferred embodiment of an arrangement according to the present invention.

Referring now to FIGURE 1, there is shown a coil arrangement composed of a coil 10 constituted by subcoils 11, 12, 13, 14, 15 and 16 and a coil 17 constituted by subcoils 18, 19, 20, 21, 22, and 23. The longitudinal axes of the coils 10 and 17 are positioned in a horizontal plane and are disposed at right angles with respect to one another. The individual subcoils are combined in groups of three each, with the subcoils of each group being disposed in line in the direction of their respective coil axis.

The configuration of the magnetic field generated by coil 10 is here indicated by the field intensity curve 24. The ordinate 25 of the curve represents vertical distances and the horizontal distance of curve 24 from the ordinate represents the intensity of the resulting field at various vertical locations. The region between points 26 and 27 represents field intensity variations within the coil 10, while field intensity variations at various points above the coil are indicated by the portion of the curve 24 appearing above the point 27. The maximum field intensity of the field outside of the coil is located approximately at the point 28 at which is disposed a detector connected to a directional gyro and disposed in a vehicle. It is the region around this point 28 which is to be utilized in the practice of the present invention because the field in the region of this point has a favorable degree of uniformity. The distance between points 26 and 28 may be readily adjusted either by varying the distance between subcoils 11 to 13 and subcoils 14 to 16, or by varying the current distribution in each of the subcoils.

It has been found that the most economical way of arranging the coils so that the vertical height of their maximum external magnetic field can be varied at will is by spacing the subcoils of each coil from one another along the longitudinal coil axis and by connecting the subcoils so that they are conductively separated from one another and magnetically connected in series. In order to vary the height of the resulting external magnetic field, it is then only necessary to individually vary the amplitude of the current through each subcoil. The field produced by the resulting coil arrangement can then be adjusted for any vertical detector height.

Another procedure for permitting a variation to be effected in the hight of the artificially produced magnetic field can be carried out by mounting the two halves of each coil so that they can be displaced with respect to one another along the line of the coil axis. The vertical height of the field intensity maximum can then be varied by varying the distance separating the two coil halves.

It has also been found that an extremely effective control of the magnetic field produced by the coil arrangement according to the present invention can be effected by forming each subcoil with two windings which are conductively isolated from one another and by supplying one of the windings with a substantially constant amplitude current and the other winding with a variable amplitude current. This arrangement permits a relatively simple coarse-fine variation of the resulting magnetic field to be effected, with the coarse control being provided by the substantially constant amplitude current and the fine control being provided by variations in the variable amplitude current.

The last-mentioned arrangement, which is employed in the circuit of FIGURE 2, is particularly useful when the coil arrangement is to form a part of a control or regulating device which is intended to continuously detect changes in earth's magnetic field and to control the field generated by the coil arrangement in response to these changes.

In order to determine the parameters of the extraneous field of a particular aircraft, it is necessary to provide, in the region of the detector, a magnetic field which corresponds to the earth's magnetic field at any desired geographic location and to give this artificially produced magnetic field any desired direction. If it is desired to determine the bearing errors which would result at any geographical location other than that at which the plane is then located, it is necessary that the capability exists for varying the parameters of the artificially produced magnetic field since, for example, the horizontal component of earth's magnetic field increases as one goes from one of the poles to the equator. In addition, it may be desirable to make such a determination with respect to the earth's magnetic field at various altitudes above the ground. This also requires a capability of varying the parameters of the artificially produced field because the magnetic field above the ground, and particularly at high altitudes, is substantially different from that at ground level.

It is also desirable that account be taken of the fact that the amplitude of a particular bearing error also depends on the magnitude of the angle between the aircraft's extraneous field and the horizontal component of earth's magnetic field. With all other conditions being equal, the bearing error will be largest when the two fields are oriented at right angles to each other. It is for this reason that it was previously necessary to rotate the aircraft being tested through 360° in order to obtain an error curve for all possible angles between the two fields. The artificial magnetic field produced by the coil arrangements according to the present invention, such as that illustrated in FIGURE 1, makes it possible to duplicate all of the various conditions described above without moving the aircraft being tested. The magnetic field produced by the coils according to the present invention is superimposed on earth's magnetic field, and the parameters of the artificial field can be so varied that the resulting field has any desired intensity and direction. The direction of the artificial field can be varied by superimposing the fields produced by the two mutually perpendicular coils 10 and 17. To this end, additional coils, subcoils or windings can advantageously be provided and can be supplied with variable amplitude direct currents in such a manner that the currents therein are related to the desired bearing angle in a sinusoidal or cosinusoidal manner. Such a superposition may, however, also be considered to constitute a complete cancellation of the influence of earth's magnetic field in the region of the detector and a generation of an artificial magnetic field having a readily adjustable amplitude and direction. The winding arrangement of a subcoil is shown by FIGURE 1a for the example of the subcoil 13. Three windings 31, 32, 33 belong to this subcoil. Each winding is stretched so far that two other windings of different subcoils fit in between the first winding. The two other windings are stretched in the same way as the first winding. By this method the magnetic field made by these three windings is as uniform as possible. Behind the subcoil 13 the subcoil 12 is shown. As the windings of the subcoil 12 have the same electrical function they are designated as windings 31', 32', 33'. Each of the subcoils 11, 12, 13 has a different distance from the point 26. If necessary, the subcoil 11, 12 or 13 is set in function. The same holds true in an analogous way for the subcoils 14 to 16, 18 to 20 and 21 to 23.

Turning now to FIGURE 2, there is shown a block diagram of a complete terrestrial magnetic field offsetting system according to the present invention. In order to determine the parameters of the horizontal component of earth's magnetic field there are provided a main magnetic field probe 29 and an auxiliary magnetic field probe 30 disposed at right angles to one another and located in a region where earth's magnetic field is not subjected to any external influences.

In the region where a detector (not shown) will be located, i.e., in the region of the extraneous field of an aircraft, the individual artificial field-producing coils are disposed. In contrast to the embodiment shown in FIGURE 1, these coils are here divided into two subcoils each, each subcoil here being shown separately in order to permit the circuit diagram to be illustrated with greater clarity. In this embodiment the windings 31, 32, and 33 constitute one subcoil and the windings 34, 35, and 36 constitute the second subcoil of a single coil, this coil being oriented with its axis parallel to the axis of probe 29. A further coil having its axis positioned at right angles to that of the first-mentioned coil, and parallel to the axis of probe 30, is also composed of two subcoils. One of these latter subcoils includes the windings 37 and 38, while the other subcoil includes the windings 39 and 40.

Referring first to the circuitry for cancelling out earth's magnetic field in the region of the detector, it may be seen that two windings 32, and 35, each of which forms a part of a respective subcoil, are supplied with current from a current source 41 having a substantially constant output. The windings 31 and 34, each of which forms a part of a different subcoil, are supplied with a current whose amplitude is controlled by the signal induced in probe 29.

Although the current fed to windings 32 and 35 is maintained at a substantially constant value, this value can not be maintained perfectly constant without regulation. Therefore, the current variations which occur in these windings are detected by a shunt 42 and transmitted to the control system for windings 31 and 34 in order to vary the current to these latter windings in such a manner as to compensate for the current variations occurring in windings 32 and 35. The amplitude of earth's magnetic field is measured by main probe 29, which is oriented substantially parallel to this field. The output signal from probe 29, which is proportional to this amplitude, is compensated by the current signals supplied from shunt 42 and is fed through a control system composed of amplifier 43, regulator 44, and amplifier 45 to windings 31 and 34. The control system associated with probe 29 also includes a feedback element 46. The shunt 42 may, for instance, be embodied by a resistor. This resistor being passed by a current produces a voltage proportional to this current. The electrical function of the regulators 44, 48, 53, 56 is identical; these elements function as described in the U.S. Patent No. 2,933,059 for instance. Furthermore a feedback similar to the feedbacks 46, 50, 55, 58 is shown there.

Although the control system which has just been described has its probe 29 oriented substantially parallel to the horizontal component of earth's magnetic field, there is provided a second control system associated with an auxiliary probe 30 oriented in a horizontal plane perpendicular to probe 29. Signals produced by probe 30 indicate directional variations in earth's magnetic field. This feedback control system includes an amplifier 47, a regulator 48, and a further amplifier 49, together with an internal feedback element 50 and supplies a signal proportional to that produced by probe 30 to windings 37 and 39. Since this latter control system only receives relatively small field intensity indications, it is not necessary to provide the subcoils of which windings 37 and 39 are a part with windings connected to a substantially constant current source.

The second part of the circuitry shown in FIGURE 2, which is not conductively connected to the first part but which is magnetically coupled thereto via the various coils, serves to produce an artificial magnetic field having a desired direction and having as constant an amplitiude as possible in the region of the detector. Since the field produced by windings 31, 32, 34, 35, 37 and 39 serves to completely offset the ambient terrestrial magnetic field, the field produced by the second part of the circuit can have any desired direction and amplitude.

One horizontal component of the artificial magnetic field is generated by the windings 33 and 36 and an orthogonal horizontal component is generated by windings 38 and 40. A separate control circuit is provided for each of these two pairs of windings. The control circuit for windings 33 and 36 includes a current generator 51 whose output current amplitude varies in a sinusoidal manner in accordance with the desired bearing of the artificial magnetic field. The control circuit for windings 38 and 40 includes a current generator 52 the amplitude of whose output current varies in a cosinusoidal manner in accordance with the desired artificial field bearing. The first control circuit includes a feedback control system composed of a regulator 53, an amplifier 54, and a feedback element 55. Similarly, the second control circuit includes a feedback control system having a regulator 56, an amplifier 57 and a feedback element 58.

The control of generators 51 and 52 is preferably ganged, by means of a mechanical control 59 for example, so that the outputs from the two generators are varied simultaneously by control 59 in accordance with the desired bearing of the resultant artificial magnetic field.

It may thus be seen that the field producing arrangement according to the present invention greatly facilitates the speed and accuracy of the extraneous magnetic field measurement and permits the amplitude and direction of these fields to be measured in great detail. However, since it is generally desired only to determine the bearing error produced by these fields, it will very often be sufficient merely to plot the resulting bearing error curve during a test.

The high degree of uniformity of the external field produced by coil arrangements according to the present invention permits a very accurate determination of the bearing errors due to the extraneous field to be obtained. Moreover, the present invention makes it unnecessary to provide any additional connections to the detector unit within the aircraft. Furthermore, the time-consuming current amplitude adjustment required in the prior art testing arrangements, as well as the alignment of the coil arrangements and of the measuring instruments which had to be carried out according to the prior art techniques, are rendered unnecessary by the present invention.

Because the artificial field-producing coil arrangements according to the present invention are capable of producing a magnetic field having any desired direction and amplitude, these coils may be permanently positioned below the earth's surface, for example, and will thus be protected from any external influences when utilized for compensating the terrestrial magnetic field to which detectors within the aircraft to be tested are subjected. Since these coil arrangements can be permanently placed below ground, they can be used to carry out measurements even in the open air and under any weather conditions.

While the present invention has been described in connection with compass-guided directional gyro units for airplanes, is should be appreciated that this invention can be applied equally well to similar units provided on ships or guided missiles.

It will be understood that the above description of the present invention is susceptible to various modifications, changes, and adaptations, and the same are intended to be comprehended within the meaning and range of equivalents of the appended claims.

What is claimed is:

1. A device for use in determining the bearing error produced in a compass-guided directional gyro provided with a magnetic field detector, which bearing error is due to the extraneous magnetic fields produced by the vehicle in which such detector is mounted, comprising, in combination:
    (a) a coil arrangement disposed in a region outside of the vehicle whose system is to be examined and composed of at least two coils whose axes extend substantially horizontally and are angularly offset from one another, said coil arrangement being positioned for producing an artificial magnetic field external to itself and extending laterally from the coil axes through the region occupied by such detector, which field has a variable direction and intensity in the region in which such detector is located, whereby the difference between the directional indication of such directional gyro and the resultant direction of the superposed ambient terrestrial magnetic field and said artificial magnetic field represents the bearing error to be determined; and
    (b) variable current producing means connected to said coil arrangement for supplying currents thereto whose amplitudes determine the intensity and direction of said artificial magnetic field.

2. An arrangement as defined in claim 1 wherein the axes of said two coils are disposed in a horizontal plane is at right angles with respect to one another.

3. An arrangement as defined in claim 2 wherein each said coil has a linear axis and has a vertical thickness dimension which is small in comparison with the horizontal length and width thereof.

4. In combination with an arrangement as defined in claim 1, a directional gyro for use in a vehicle navigation system, and a magnetic field detector operatively connected to said gyro and disposed in said artificial magnetic field.

5. A device for use in determining the bearing error produced in a compass-guided directional gyro provided with a magnetic field detector, which bearing error is due to the extraneous magnetic fields produced by the vehicle in which such detector is mounted, comprising, in combination:
    (a) a coil arrangement, disposed in a region outside of the vehicle whose system is to be examined, for producing an artificial magnetic field external to itself, which field has a variable direction and intensity in the region in which such detector is located, whereby the difference between the directional indicational gyro and the resultant direction of the superposed ambient terrestrial magnetic field and said artificial magnetic field represents the bearing error to be determined, said coil arrangement being composed of two coils both having their axes disposed in a horizontal plane, with said coils having their axes disposed at right angles with respect to one another, each of said coils being subdivided in a direction along its longitudinal axis into a plurality of subcoils which are electrically isolated from one another and which are magnetically coupled in series; and
    (b) variable current producing means connected to said coil arrangement for supplying currents thereto whose amplitudes determine the intensity and direction of said artificial magnetic field.

6. An arrangement as defined in claim 5 wherein said current producing means is connected to supply a separately variable current to each of said subcoils for varying the direction and intensity of said artificial magnetic field.

7. An arrangement as defined in claim 5 wherein each said subcoil comprises at least two electrically separated windings, and wherein said current producing means is connected to supply a substantially constant amplitude current to one of said windings of each said subcoil of one of said coils and a variable current to the other of said windings of each said coil of one of said coils.

8. An arrangement as defined in claim 7 further comprising transducer means disposed for measuring the intensity and direction of the ambient terrestrial field and connected to said current producing means for varying the amplitude of the current supplied to said other one of said windings in proportion to the amplitude of at least one horizontal component of the ambient terrestrial magnetic field.

9. An arrangement as defined in claim 8 wherein said transducer means comprises a main measuring probe and and an auxiliary measuring probe disposed at right angles to said main measuring probe, said main measuring probe being oriented to primarily detect intensity variations in the horizontal terrestrial magnetic field and said auxiliary measuring probe being oriented to detect directional variations in the terrestrial magnetic field by measuring that horizontal component of said magnetic field which is perpendicular to the horizontal component measured by said main measuring probe.

10. An arrangement as defined in claim 9 wherein said current producing means further comprises: a first current generator for providing an output whose amplitude is proportional to the sine of the desired bearing of such artificial magnetic field; and a second current generator for providing an output whose amplitude is proportional to the cosine of the desired bearing of such artificial magnetic field; and wherein one winding of each said subcoil of one of said coils is connected to the output of said first generator, and one winding of each said subcoil of the other one of said coils is connected to the output of said second generator.

References Cited

UNITED STATES PATENTS

| | | | |
|---|---|---|---|
| 2,887,873 | 5/1959 | Halpern et al. | 73—1 |
| 3,071,959 | 1/1963 | Depp | 73—1 |
| 619,618 | 2/1899 | Rellstab | 33—225 |

S. CLEMENT SWISHER, Primary Examiner

U.S. Cl. X.R.

33—225